May 5, 1925.                    1,536,802
F. LADÉBAUCHE
GASOLINE STRAINER
Filed March 6, 1924

Inventor
FLORINA LADÉBAUCHE,
By
His Attorney.

Patented May 5, 1925.

1,536,802

UNITED STATES PATENT OFFICE.

FLORINA LADÉBAUCHE, OF WOONSOCKET, RHODE ISLAND.

GASOLINE STRAINER.

Application filed March 6, 1924. Serial No. 697,283.

*To all whom it may concern:*

Be it known that FLORINA LADÉBAUCHE, a citizen of the United States of America, residing at Woonsocket, in the county of Providence and State of Rhode Island, has invented new and useful Improvements in Gasoline Strainers, of which the following is a specification.

It is a purpose of the present invention to provide, in a gasoline strainer, a construction particularly adapted for use in connection with the gasoline supply pipe which connects the tank and the carburetor, thereby acting to keep the gasoline clean in its flow and hence preventing dirt and other foreign matter from entering the carburetor, thereby not only precluding carbonization but also reducing carburetor trouble to a minimum.

Another purpose is to provide a strainer which precludes the necessity of a strainer in the tank or in the carburetor, it being obvious that the present form of strainer may be used on the supply pipe leading from the tank to the carburetor in a position as close as possible to the carburetor.

Still another purpose in the provision of a strainer which may be easily applied to any make of automobile and may be readily removed to permit the strainer to be disassembled and the parts thereof cleaned, subsequently to which the strainer may be reassembled and again installed in position.

It is to be understood that the particulars herein given are in no way limitative and that, while still keeping within the scope of the invention, any desired modifications of detail and desired proportions may be made in the device according to the circumstances.

The invention comprises further features and combinations of parts to be hereinafter set forth, shown in the drawings and claimed.

Figure 1:
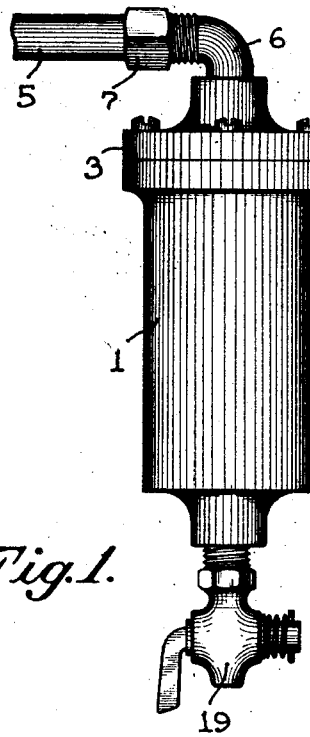
Figure 1 is a view in perspective of the improved strainer constructed in accordance with the invention.
Figure 2:
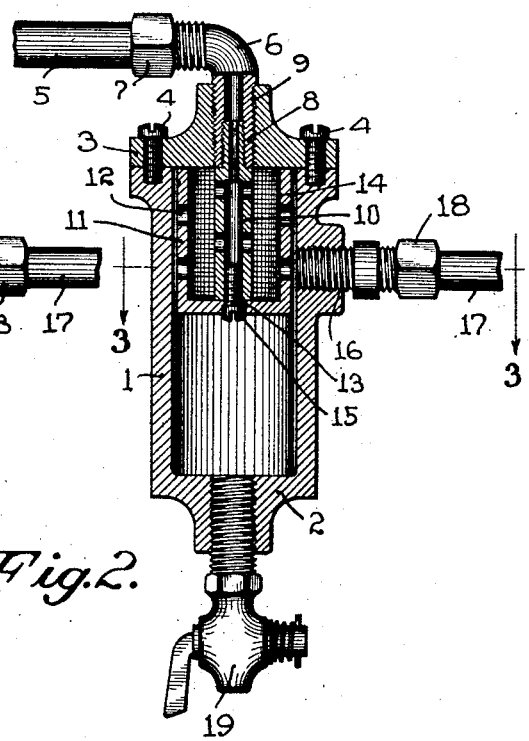
Figure 2 is a vertical sectional view through the same.
Figure 3:
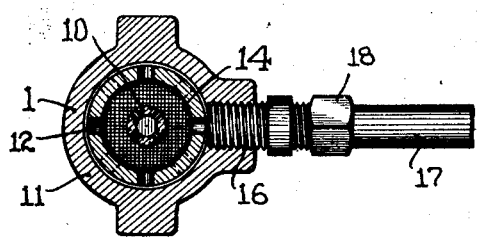
Figure 3 is a transverse sectional view on line 3—3 of Figure 2.
Figure 4:
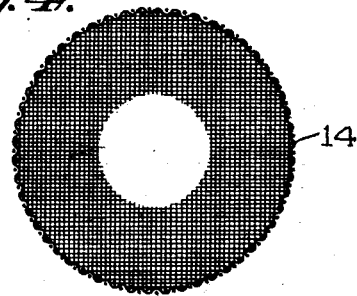
Figure 4 is an enlarged detail view of the strainer proper removed from the casing.

Referring to the drawings, 1 designates the casing of the strainer which may be any suitable proportions and constructed of any suitable metal. The casing is in cast form, the exterior and interior being subsequently machined in order to present a neat appearance. The casing has a bottom 2 and a cap 3 which is held in place by suitable cap screws 4.

A pipe 5 leading from a gasoline tank on an automobile is connected to the elbow 6 by means of a nipple or other coupling 7. The elbow 6 has a tapered end 8 which engages through the opening 9 in the cap and the extremity of the tapered end 8 is internally threaded, into which a short tube 10 is threaded. This tube 10 is perforated in its cylindrical wall and depends from the elbow on the interior of the casing 1.

A cylindrical basket 11 is positioned on the interior of the casing with its cylindrical wall perforated, as shown at 12. The bottom of the basket has an opening 13. The perforated basket is disposed in the upper part of the casing 1 so that the perforated tube 10 will position centrally of the basket. The tube 10 is of considerably less diameter than the basket. However, prior to permitting the tube 10 to position centrally of the basket, a copper wire fabric strainer proper 14 is fitted within the perforated basket. This strainer proper is of a diameter to engage the inner circumference of the basket and act to thoroughly strain the gasoline in its passage to the carburetor.

The bottom of the strainer proper also has an opening similar in diameter to the opening 13 of the basket and after disposing the strainer proper 14 in position, the perforated tube 10 extends into the strainer proper, and a screw 15 is engaged through the opening 13 in the bottom of the perforated basket and is then threaded into the perforated tube, thereby not only holding the basket in position disposed in the upper portion of the chamber of the casing but also retaining the strainer proper in place.

The side of the casing 1 at a position adjacent the perforated basket is provided with an opening 16 to which a pipe 17 is connected by means of a coupling 18. The pipe 17 is adapted to connect with a carburetor (not shown) for the purpose of conveying strained gasoline to the carburetor In other words, the gasoline in passing into the casing 1 is strained by the strainer proper and then passes out through the pipe 17 to the carburetor. The bottom of the casing 1 has connected thereto a drain cock or faucet 19 to drain off any water or other foreign matter that may collect in the bottom of the casing.

The invention having been set forth, what is claimed is:

1. A gasoline strainer comprising a casing provided with an inlet at one end and an outlet at right angles to the inlet, a strainer proper in the casing above the bottom thereof between the inlet and the outlet, means at the bottom for drawing off any water, sediment or the like from below the strainer proper, said strainer comprising a perforated basket, a wire fabric strainer in the basket, and a perforated tube connected to the inlet and, in turn, fastened to the bottom of the basket to hold the basket and the wire fabric strainer in position to strain the gasoline before it passes out through the outlet.

2. A gasoline strainer including a casing provided with an inlet pipe at one end and an outlet pipe at the side at right angles to the inlet pipe, a cylindrical perforated basket, a wire fabric strainer proper corresponding to and fitting within the basket, a perforated tube threaded into the inlet pipe and terminating in a position at the bottom of the wire fabric strainer, and means passing through the perforated basket and threaded into the perforated tube for connecting the basket to the inlet pipe, whereby the gasoline may strain in passing from the inlet pipe through the outlet pipe, the bottom of the casing having a discharge opening including an offset for drawing off any water or sediment in the bottom of the casing below the perforated basket.

In testimony whereof she affixes her signature.

FLORINA LADÉBAUCHE.